(12) United States Patent
Lord et al.

(10) Patent No.: US 7,980,526 B2
(45) Date of Patent: Jul. 19, 2011

(54) PORTABLE INCLINATING DESK FOR NOTEBOOK COMPUTERS

(75) Inventors: Charles Lord, Scottsdale, AZ (US);
Thomas P. Muday, Scottsdale, AZ (US);
Randal Toltzman, Scottsdale, AZ (US)

(73) Assignee: Hotwire Development, LLC, Scottsdale, AZ (US)

( * ) Notice: Subject to any disclaimer, the term of this patent is extended or adjusted under 35 U.S.C. 154(b) by 109 days.

(21) Appl. No.: 12/215,594

(22) Filed: Jun. 26, 2008

(65) Prior Publication Data
US 2009/0002932 A1  Jan. 1, 2009

Related U.S. Application Data

(60) Provisional application No. 60/937,395, filed on Jun. 26, 2007.

(51) Int. Cl.
*A47B 97/04* (2006.01)

(52) U.S. Cl. ............ 248/444; 108/1; 248/454; 248/371; 248/188.2; 248/917; 361/679.09; 361/679.55

(58) Field of Classification Search ............. 361/679.02, 361/679.09, 679.55; 312/208.1; 248/118, 248/118.3, 371, 174, 188.2, 160, 444, 454, 248/346.01, 346.05, 917, 918; 108/1, 7
See application file for complete search history.

(56) References Cited

U.S. PATENT DOCUMENTS

| | | | |
|---|---|---|---|
| 4,441,758 A * | 4/1984 | Fleischer et al. | ......... 297/423.46 |
| 5,143,341 A | 9/1992 | Juster | |
| 5,616,897 A | 4/1997 | Weber et al. | |
| 5,732,910 A | 3/1998 | Martin | |
| 5,893,540 A | 4/1999 | Scott | |
| 5,927,669 A | 7/1999 | Sassman | |
| 6,003,446 A | 12/1999 | Leibowitz | |
| 6,234,085 B1 | 5/2001 | Ramundo | |
| 6,305,652 B1 | 10/2001 | Borke et al. | |
| 6,353,530 B1 | 3/2002 | Zarek et al. | |

(Continued)

FOREIGN PATENT DOCUMENTS

DE      82 10 589 U1      8/1982

(Continued)

OTHER PUBLICATIONS

EPO Search Report, Apr. 30, 2009, Charles Lord.

(Continued)

*Primary Examiner* — Terrell McKinnon
*Assistant Examiner* — Bradley H Duckworth
(74) *Attorney, Agent, or Firm* — Robert C. Klinger

(57) ABSTRACT

A portable desk for use in home and office environments for comfortably and conveniently supporting a portable computer or other electronic device on the lap or knees of a user. The desk has an upper surface on which the computer rests. The desk is supported on the user's lap by a flexible, bowable support member which is repositionable, thus allowing the user to change the inclination of the desk in order to adjust the viewing angle of the computer screen. A flexible tray for an accessory such as a mouse may be inserted in a slot at either side of the desktop. The tray may be reversibly inserted with a smooth, planar surface or a textured, frictional surface disposed facing upwardly. Ventilation is provided through a transversely recessed convex channel in the upper surface and may also include a small, USB-powered fan to increase heat dissipation. Cable management features may also be provided.

22 Claims, 9 Drawing Sheets

U.S. PATENT DOCUMENTS

| | | | |
|---|---|---|---|
| 6,353,536 | B1 | 3/2002 | Nakamura et al. |
| 6,527,241 | B1 | 3/2003 | Lord |
| 6,568,650 | B2 | 5/2003 | Helmetsie et al. |
| 6,682,040 | B1 | 1/2004 | MacEachern |
| 7,035,100 | B2 * | 4/2006 | Lord ................. 361/679.41 |
| 7,121,214 | B1 | 10/2006 | Taltzman et al. |
| 7,161,799 | B2 | 1/2007 | Lim et al. |
| D554,135 | S | 10/2007 | Lim et al. |
| 7,322,063 | B2 | 1/2008 | Esimai |
| 7,327,560 | B1 | 2/2008 | Tabasso et al. |
| 7,359,184 | B2 | 4/2008 | Lord |
| D578,130 | S | 10/2008 | Sween et al. |
| D579,455 | S | 10/2008 | Chu |
| 7,545,634 | B2 * | 6/2009 | Simonian et al. ........ 361/679.55 |
| 2003/0058615 | A1 * | 3/2003 | Becker et al. .................. 361/687 |
| 2006/0192070 | A1 * | 8/2006 | Chan ............... 248/371 |
| 2006/0285283 | A1 | 12/2006 | Simonian et al. |
| 2007/0258206 | A1 | 11/2007 | Huang |
| 2008/0029412 | A1 * | 2/2008 | Ho et al. ................. 206/320 |
| 2008/0029684 | A1 | 2/2008 | Rowland |
| 2008/0061207 | A1 | 3/2008 | Panziera et al. |
| 2009/0179132 | A1 * | 7/2009 | Qin et al. ................ 248/371 |
| 2010/0008039 | A1 * | 1/2010 | Shen et al. ............... 361/679.55 |

FOREIGN PATENT DOCUMENTS

| | | |
|---|---|---|
| DE | 199 52 277 A1 | 5/2001 |
| DE | 20 2005 017 227 U1 | 3/2006 |
| EP | 0 859 305 A2 | 8/1998 |
| EP | 1 531 485 A1 | 5/2005 |
| EP | 1 513 045 A2 | 9/2005 |
| WO | WO 98/34851 | 8/1998 |
| WO | WO 01/66358 A1 | 9/2001 |
| WO | WO 2004/104803 A2 | 2/2004 |

OTHER PUBLICATIONS

EPO Written Opinion, Apr. 30, 2009, Charles Lord.
EPO Search Report, Apr. 6, 2009, Lord.
EPO Written Opinion, Apr. 6, 2009, Lord.
Targus Chill Mat—Quick Start Instruction Sheet—Targus Group International; Jan. 2007, pp. 1-2, XP-002529112—Figure 4.
Tiffany Boggs; "Belkin Laptop Cooling Pad/Stand Review", Oct. 9, 2007, pp. 1-5, XP 002529113.

* cited by examiner

PORTABLE INCLINATING DESK FOR NOTEBOOK COMPUTERS

CLAIM OF PRIORITY

This application claims priority of U.S. Provisional Patent Application 60/937,395 entitled DESK FOR PORTABLE COMPUTERS, filed Jun. 26, 2007, the teaching of which are incorporated herein by reference.

FIELD OF THE INVENTION

The present invention relates to a portable desk for supporting a portable laptop computer or similar device in a use position supported on a user's lap when the user is in a sitting or reclined position.

BACKGROUND OF THE INVENTION

Because of their portability and wireless capability, notebook computers, laptop computers, as well as other devices, are commonly used in a variety of positions such as pool side or while the user is sitting or reclining on a couch or bed. This often requires the user to place the computer on his or her knees or lap which is inconvenient, uncomfortable because of heat dissipation, and does not provide the viewability of the screen or monitor as desired by the user. In addition, operation of peripheral devices such as input devices like a mouse may not be convenient.

SUMMARY OF INVENTION

The present invention achieves technical advantages as a portable desk having an outwardly bowable lower member for supporting and stabilizing a notebook computer in a convenient position on the user's lap or knees for viewing, access, and use. The bowable member is configured to rest on the user and adjusts the inclination of the portable desk. The outwardly bowable member is secured and affixed to a lower surface of the desk by a first portion of the bowable member. The lower surface of the portable desk includes a recess wherein a second portion of the bowable member is selectively disposable into the recess as a function of an adjustment mechanism. By selectively positioning the second portion of the bowable member, the inclination of the portable desk can be changed in accordance with the user's preference. The bowable member is properly contoured for comfort. The cavity between the lower surface of the portable desk and the bowable member can be used to store items such as power adaptors, power cords, and input devices, and the storage area is accessible from either side of the desk. The upper surface of the portable desk is concave creating a channel to provide airflow for ventilation when a computer is positioned on the desk, and in one embodiment, the portable desk may include a USB-powered fan to provide additional cooling. The portable desk also accommodates a flexible, reversible slide-out tray to hold a peripheral device or an accessory such as a mouse. In one embodiment, the portable desk may also be provided with a cushion on the lower edge of the desk surface that the user may rest his or her wrists on for comfort.

BRIEF DESCRIPTION OF THE DRAWINGS

Advantages of the invention and the specific embodiments will be understood by those of ordinary skill in the art by reference to the following detailed description of preferred embodiments taken in conjunction with the drawings, in which.

DETAILED DESCRIPTION OF THE PRESENT INVENTION

The numerous innovative teachings and aspects of the present invention will be described with particular reference to the following exemplary embodiments. However, it should be understood that this class of embodiments provides only a few examples of the many advantageous uses and innovative teachings of the inventor. In general, statements made in the specification of the present application do not necessarily delimit any of the various claimed inventions. Moreover, some statements may apply to some inventive features, but not to others.

In accordance with one aspect of the invention, the present invention achieves technical advantages by providing a portable desk for supporting and stabilizing a notebook computer or similar electronic device in a convenient position supported on a user's lap or knees for viewing, access, and use. An upper surface of the desk supports the computer and a flange on the front edge of the upper surface prevents the computer from sliding when the desk is inclined.

A lower surface of the desk has a flexible, bowable support member which can be affixed to the lower surface of the desk in several slidable positions so that it forms an arcuate support for the desk. The lower surface of the desk includes a recess wherein the bowable member is selectively disposed. By means of an adjustment mechanism, the elevation and inclination of the desk can be changed in accordance with the user's preference by selectively positioning a front edge of the bowable member in the internal recess. The bowable member is properly contoured for comfort. The cavity created between the lower surface of the desk and the bowable surface can be used to store items such as power adaptors, power cords, and input devices. The storage area is accessible from either side of the desk.

The upper surface of the desk is concave having a channel to provide airflow for ventilation, and in one embodiment, may include a powered fan to provide additional cooling. The powered fan may be operated by a battery or other power source, such as via a USB cable from the laptop to further assist in the dissipation of heat.

The desk also accommodates a reversible, flexible slide-out tray for a peripheral device or an accessory such as a mouse. The tray may be inserted in either side of the desktop to accommodate right or left hand use.

The desk may also be provided with a flange on the front edge of the upper surface to prevent the computer from sliding when the desk is inclinated and a cushion on the flange which the user may rest his or her wrists or hands on for comfort.

Figure 1:
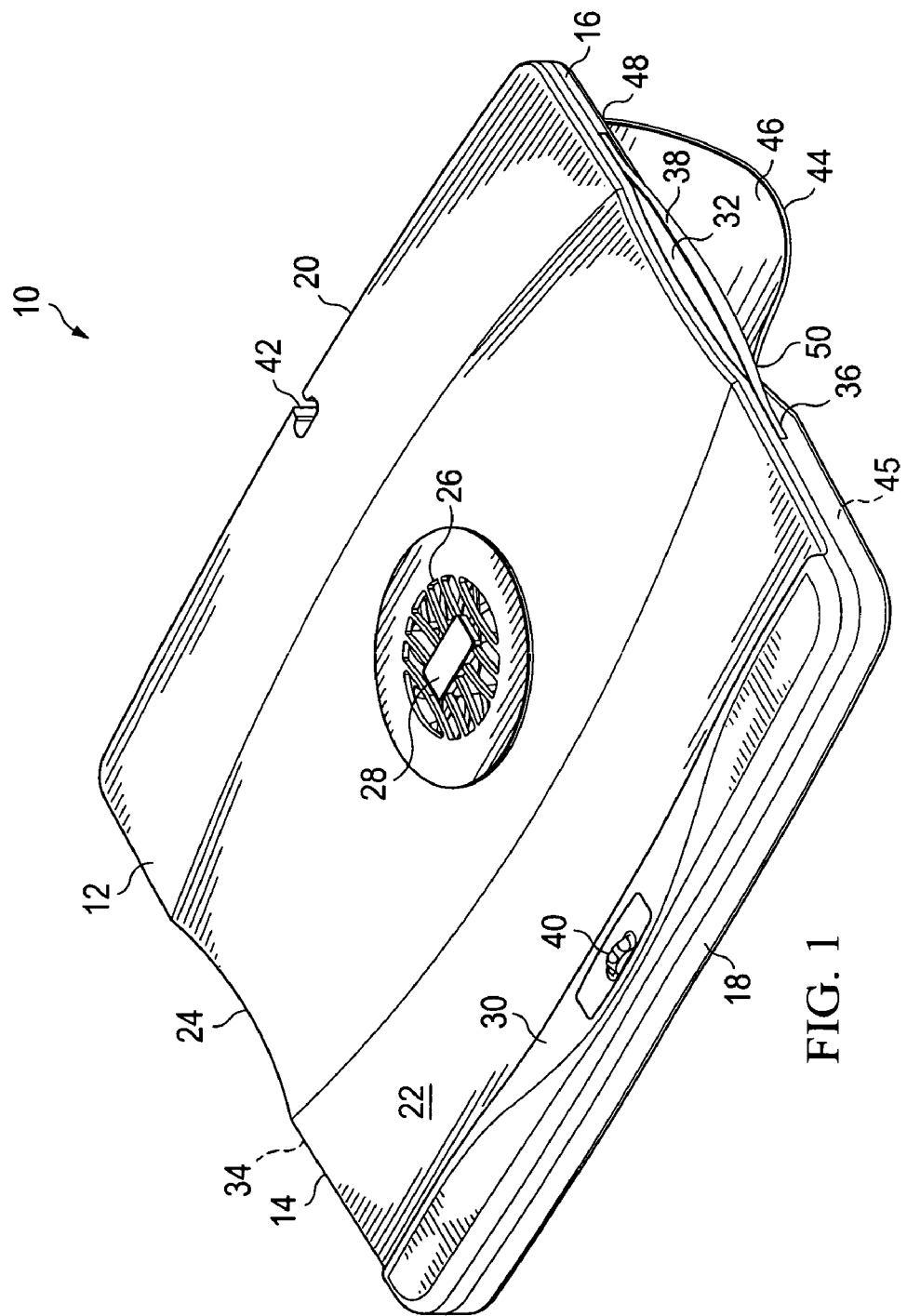
FIG. 1 shows a perspective view of the portable desk as viewed from the front right corner of the top side.

Turning now to the drawings, FIGS. 1 through 6 each show different views of portable desk 10. Referring now to FIG. 1, there is shown a perspective view of the desk as viewed from the front right of the top side in accordance with one aspect of the present invention. The portable desk has a top surface 12 which is generally dimensioned to receive and support a device such as a notebook computer. The portable desk 10 has opposite left and right sides 14 and 16, respectively, and opposite front and rear edges 18 and 20, respectively. The terms "left," "right," "front," and "rear" are used with respect to the orientation as shown in FIG. 1 when a user would be looking at a screen of laptop computer positioned on the desk.

The sides 14 and 16 and the front and rear edges 18 and 20 may be slightly curved for aesthetic and functional considerations. The desktop is made of a suitable rigid, durable plastic material such as ABS and may be fabricated by conventional techniques such as injection molding. The upper surface 22 of the desk is generally planar and may have a transverse recess or concave channel 24 having a central opening 26 for ventilation and dissipation of heat generated by the computer. As an optional feature, the central opening 26 may include a small fan 28 operated by a battery or other power source such as via a USB cable from the laptop to further assist in the dissipation of heat.

In one embodiment, a flange or projection 30 extends transversely adjacent or along the front edge 18 of the upper surface 22 to retain a device such as a computer on the portable desktop 10 and prevents the computer from slipping. The flange 30 may incorporate cushioning for supporting the user's wrists and/or hands.

Left and right side opening slots 34 and 36, respectively, are provided in opposite sides 14 and 16 of the top 12, having detents in the slots. Either slot will slidably receive an accessory tray 32, retaining the tray 32 by the detents. The flexible tray 32 is shown as a molded plastic panel to provide an area for using an accessory such as a mouse. One surface of the flexible tray 32 is preferably textured covered with a material such as Mylar® which will provide the necessary frictional engagement with a device such as a mouse. The opposite surface of the flexible tray 32 is smooth. The outer edge of flexible tray 32 is shown having a lip 38 extending upwardly from the textured surface which the user may grasp to access and slide the tray in and out of its slot. The flexible tray 32 may be inserted in either of the opening slots 34 or 36 at either opposite edge 14 or 16 of the desktop for left or right hand use, respectively. The flexible tray 32 may also be inserted in either opening slot 34 or 36 with either the textured surface or smooth surface facing upwardly retained by the detents. With the smooth surface upwardly disposed, the entire surface is planar and the lip 38 is facing downwardly and does not restrict movement of a mouse on the tray 32. With the textured surface upwardly disposed, the surface is planar minus the upwardly extended lip 38.

In a first embodiment, an adjustment mechanism 40 is rotatably mounted in a slot adjacent to the front edge 18 of the top 12 of the portable desktop 10 and will be described in more detail in FIG. 7.

In a second embodiment, an adjustment mechanism 70 is a depressable button located on the lower surface of the portable desktop 10 and will be described in more detail in FIGS. 8 and 9.

A keyhole-shaped slot 42 in the rear edge 20 is provided for insertion, retention, and management of cables extending from the storage area.

Height adjustment is accomplished by a flexible, bowable support member 44. The bowable member 44 may be a suitable plastic material such as a polypropylene approximately 1 to 1.5 mils thick. The bowable member 44 is shown as being generally rectangular having rear edge 48 and front edge 50. The rear edge 48 is affixed to the lower side of the portable desk 10, spaced inwardly from the rear edge 20. The lower surface of the portable desk 10 includes an internal recess 45 wherein the bowable member 44 is selectively disposable into the internal recess 45 as a function of the adjustment mechanism 40. Angular adjustment of the inclination of the desk is achieved by slidably positioning the front edge 50 of the bowable member 44 closer to or further from the front edge 18 of the portable desk 10 which decreases or increases, respectively, the inclination of the top surface 12 of the portable desk 10.

A storage cavity 46 may be created between the lower surface of the portable desk 10 and the bowable member 44 when the bowable member 44 is extended, either partially or fully, from the internal recess 45 and can be used to store items such as a power adaptor, power cord, and/or mouse when they are not in use. The storage cavity 46 is accessible from either side of the portable desk surface and the size of the available storage cavity 46 is dependent on the position of the front edge 50 of the flexible support 44.

Figure 1A:
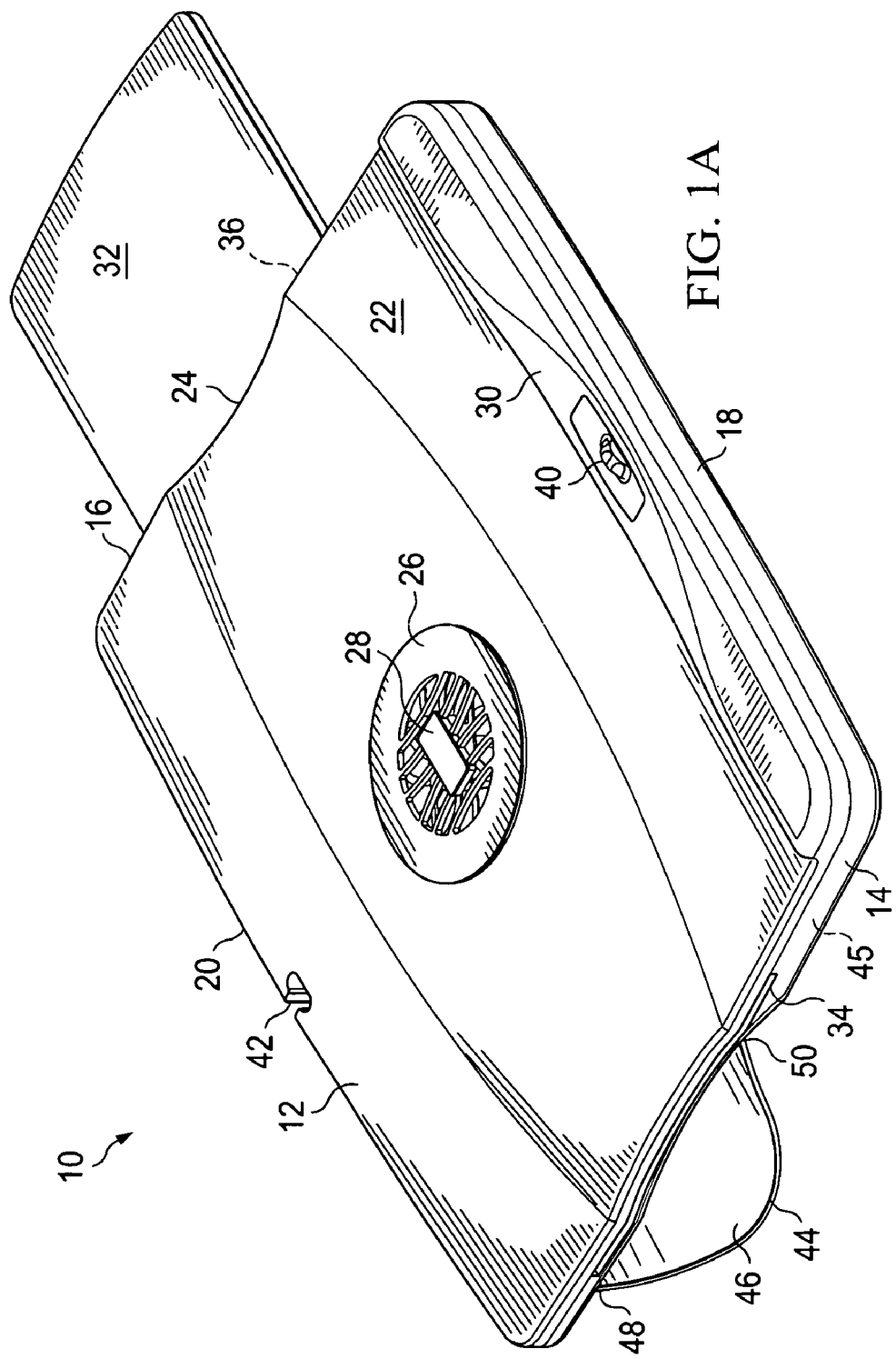
FIG. 1A shows a view similar to FIG. 1 as viewed from the front left corner of the top side with the accessory tray extended from the right side of the portable desk.

Referring now to FIG. 1A, there is shown a perspective view of the desk as viewed from the front left of the top side with the accessory tray 32 extended from the right side 16 of the portable desk 10 in accordance with one aspect of the present invention.

Figure 2:
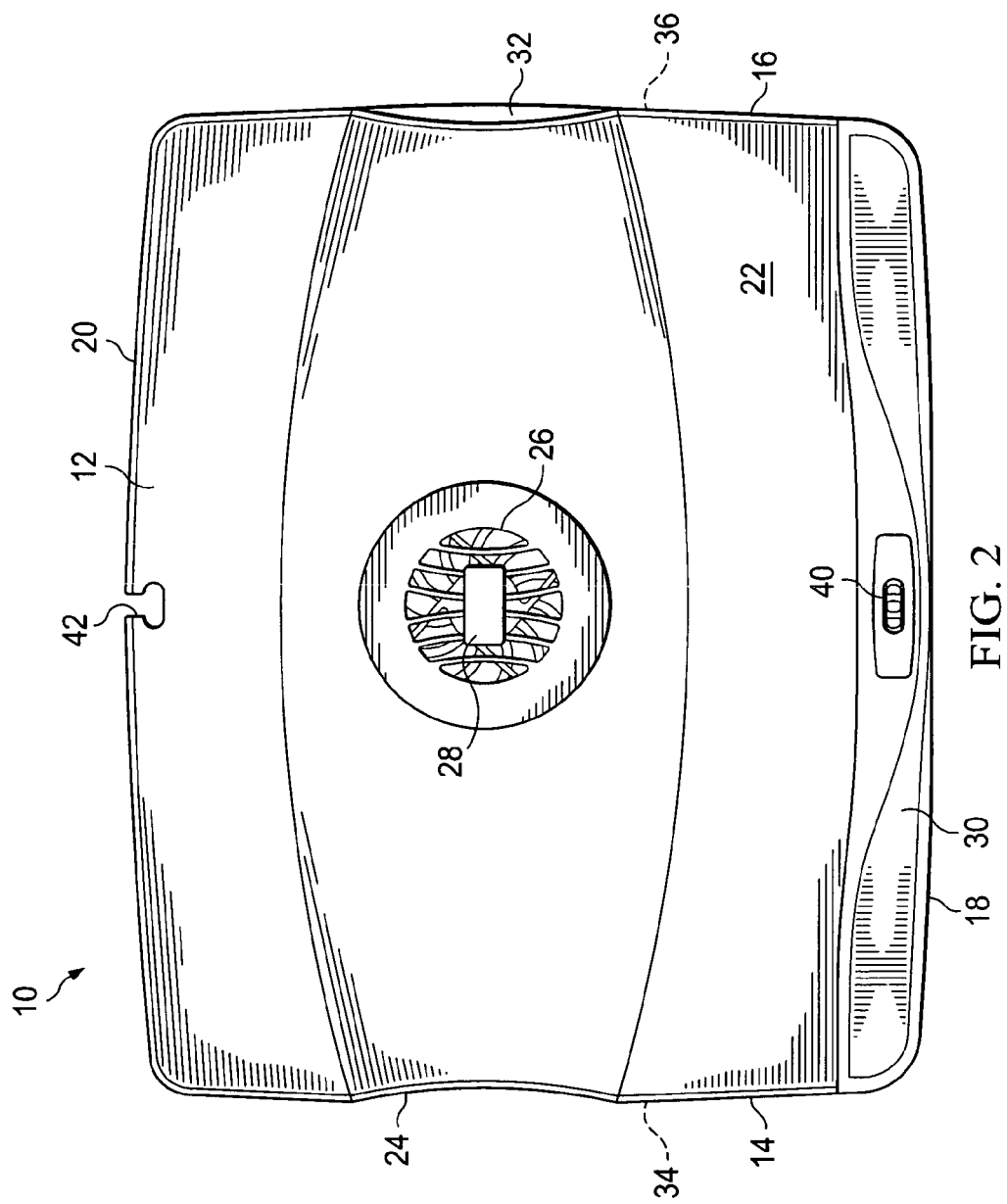
FIG. 2 shows a top view of the portable desk with the accessory tray retracted into the right side of the desk.

Referring now to FIG. 2, there is shown a top view of the portable desk 10 with the accessory tray 32 retracted into right side opening slot 36 in accordance with one aspect of the present invention.

Figure 3:
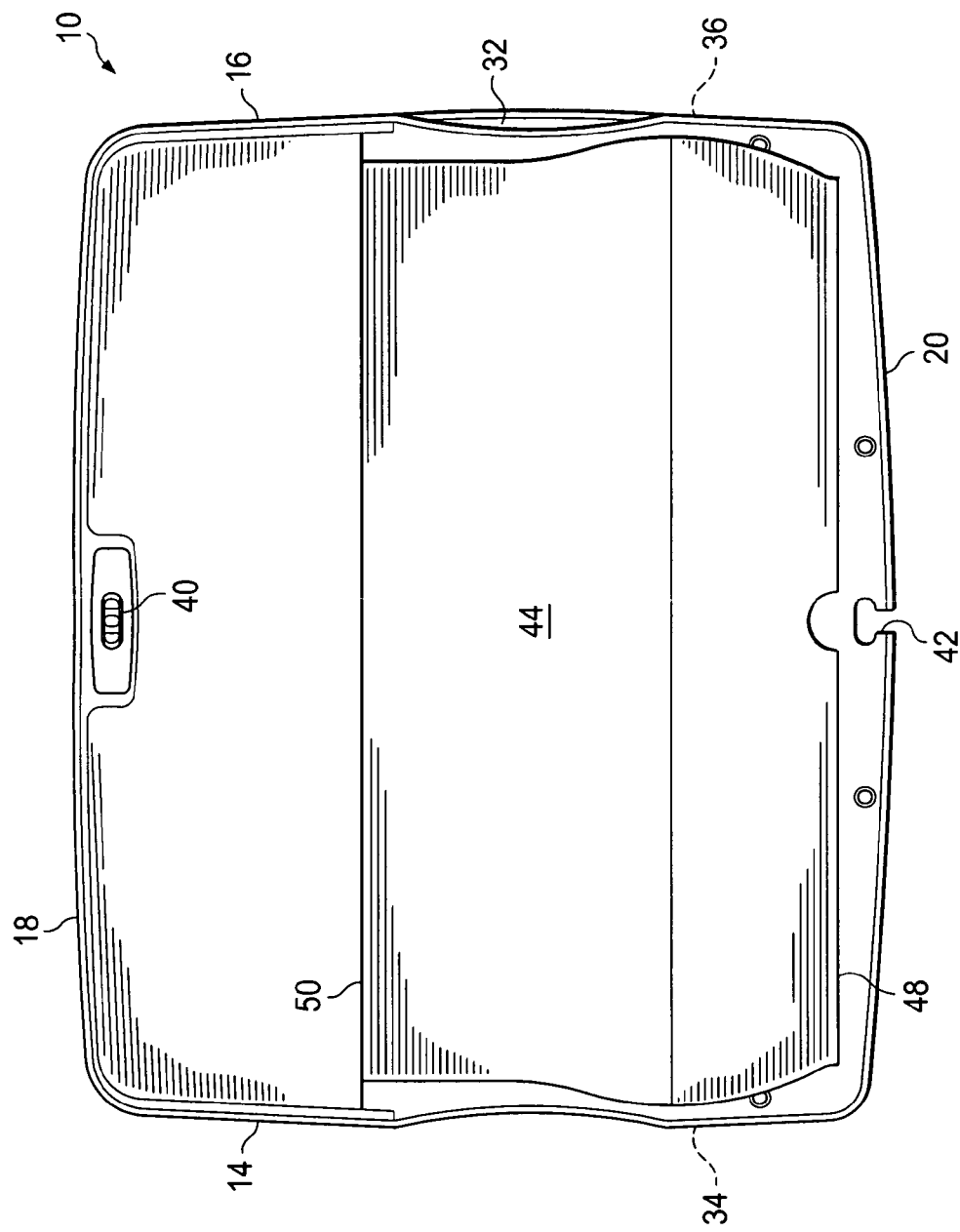
FIG. 3 shows a bottom view of the portable desk showing the bowable support surface.

Referring now to FIG. 3, there is shown a bottom view of the portable desk 10 showing the arcuate support surface of the bowable member 44 in accordance with one aspect of the present invention. The rear edge 48 of the bowable member 44 is shown adjacent to the rear edge 20 of the portable desk 10 and is affixed and secured proximate the rear edge 20. The front edge 50 of the bowable member 44 is moved closer to or further from the front edge 18 of the portable desk 10 by the adjustment mechanism 40 by slidably positioning the front edge 20 of the bowable member 44 in internal recess 45 in order to adjust the inclination of the portable desk top surface 12.

Figure 4:
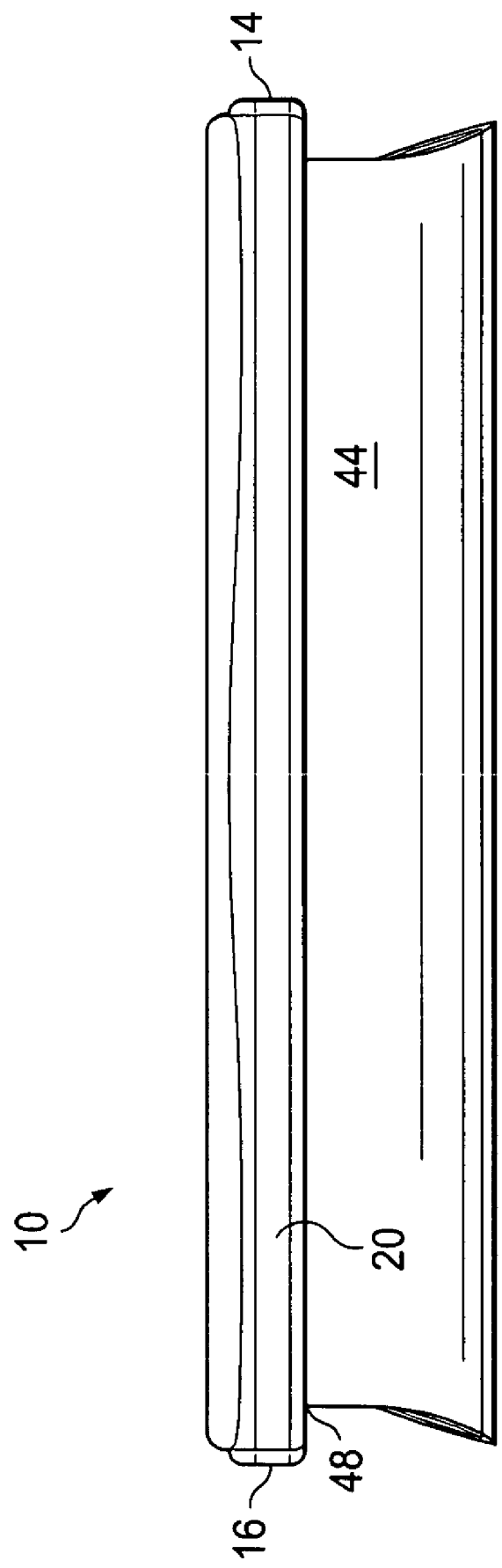
FIG. 4 shows a rear view of the portable desk showing the bowable support surface.

Referring now to FIG. 4, there is shown a rear view of portable desk 10 showing the arcuate support surface of the bowable member 44 in accordance with one aspect of the present invention.

Figure 5:
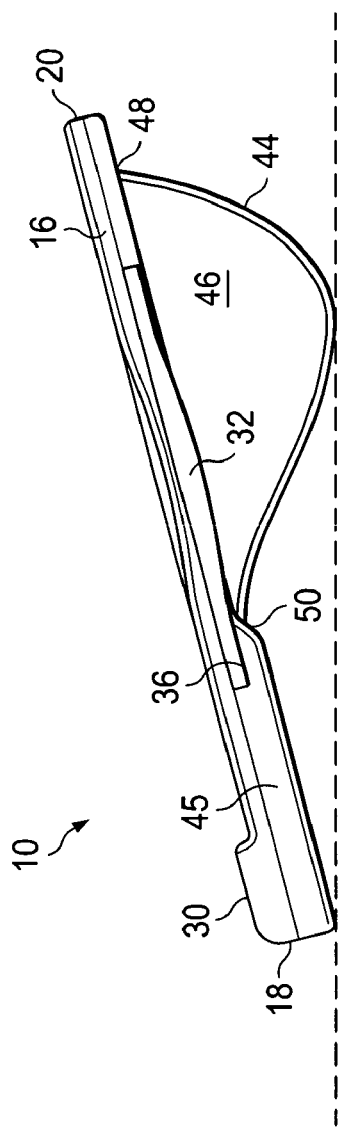
FIG. 5 shows a side view of the portable desk supported on a working surface with the bowable support in a first elevational position.

Referring now to FIG. 5, there is shown a right side view of portable desk 10 with bowable member 44 fully extended from the internal recess 45 to fully incline the top surface 12 of the portable desk 10 in accordance with one aspect of the present invention. When the bowable member 44 is fully extended from the internal recess 45 by using the adjustment mechanism 40 to push the front edge 50 of the flexible support furthest from the front edge 18 of the portable desktop, the storage cavity 46 is at its maximum size.

Figure 6:
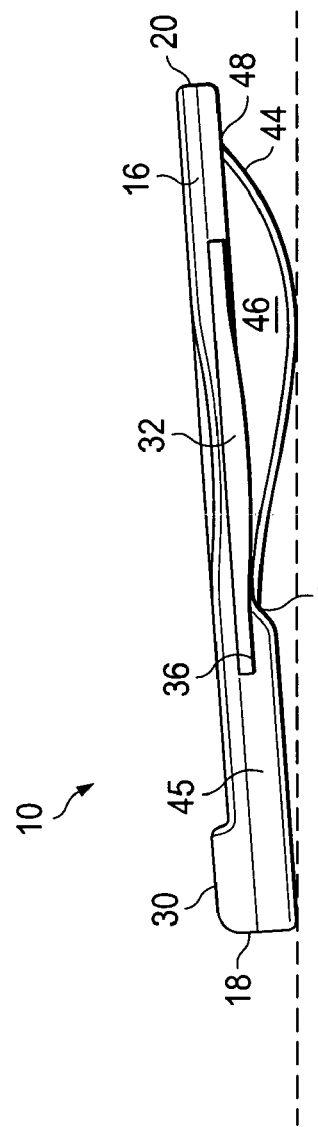
FIG. 6 shows a view similar to FIG. 5 with the bowable support in a second elevational position.

Referring now to FIG. 6, there is shown a right side view of portable desk 10 with bowable member 44 partially retracted into the internal recess 45, reducing the inclination of the top surface 12 of the portable desk 10 in accordance with one aspect of the present invention. When the bowable member 44 is partially retracted into the internal recess 45 by using the adjustment mechanism to allow the front edge 50 of the flexible support to be closer to the front edge 18 of the portable desktop, the storage cavity 46 is reduced in size.

Figure 7:
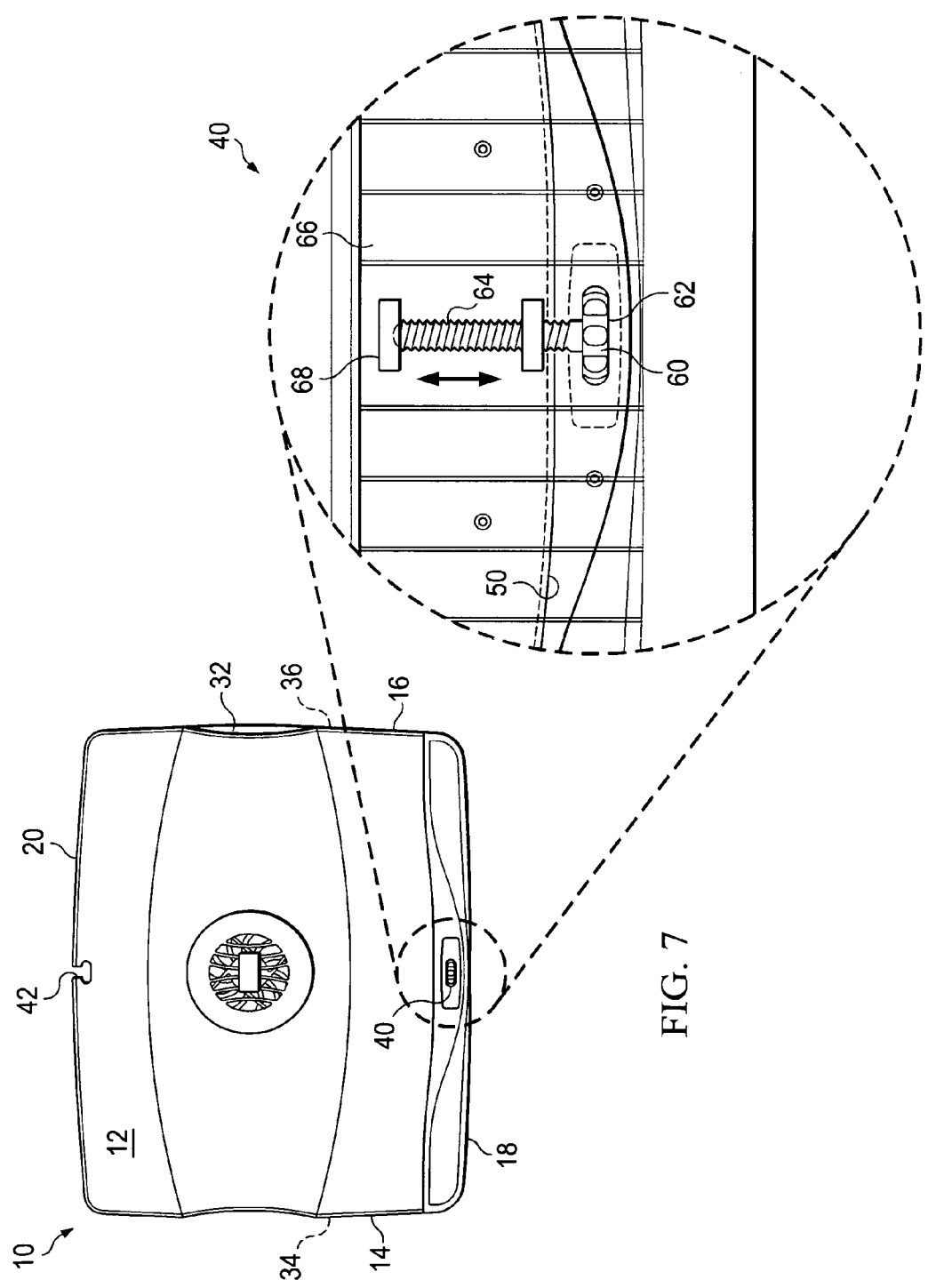
FIG. 7 shows a first embodiment of an adjustment mechanism for advancing the lead screw against the bowable support.

Referring now to FIG. 7, there is shown a first embodiment of the adjustment mechanism 40 for varying the effective length of bowable member 44 and effectively changing the inclination of the portable desk 10 in accordance with one aspect of the present invention. A thumb wheel 60 is rotatably mounted in a slot 62 adjacent to the front edge 18 of the top 12 of the portable desk 10. Rotation of the wheel 60 will, through a lead screw 64, move block 68 on a support 66 providing slidable adjustment fore and aft of the front edge 50 of the bowable member 44 in order to increase or decrease the inclination of the top surface 12 of the portable desk 10. As previously noted, when the inclination of top surface 12 of the portable desk 10 is changed by extending or retracting bowable member 44, the area of storage cavity 46 changes in size.

Figure 8:
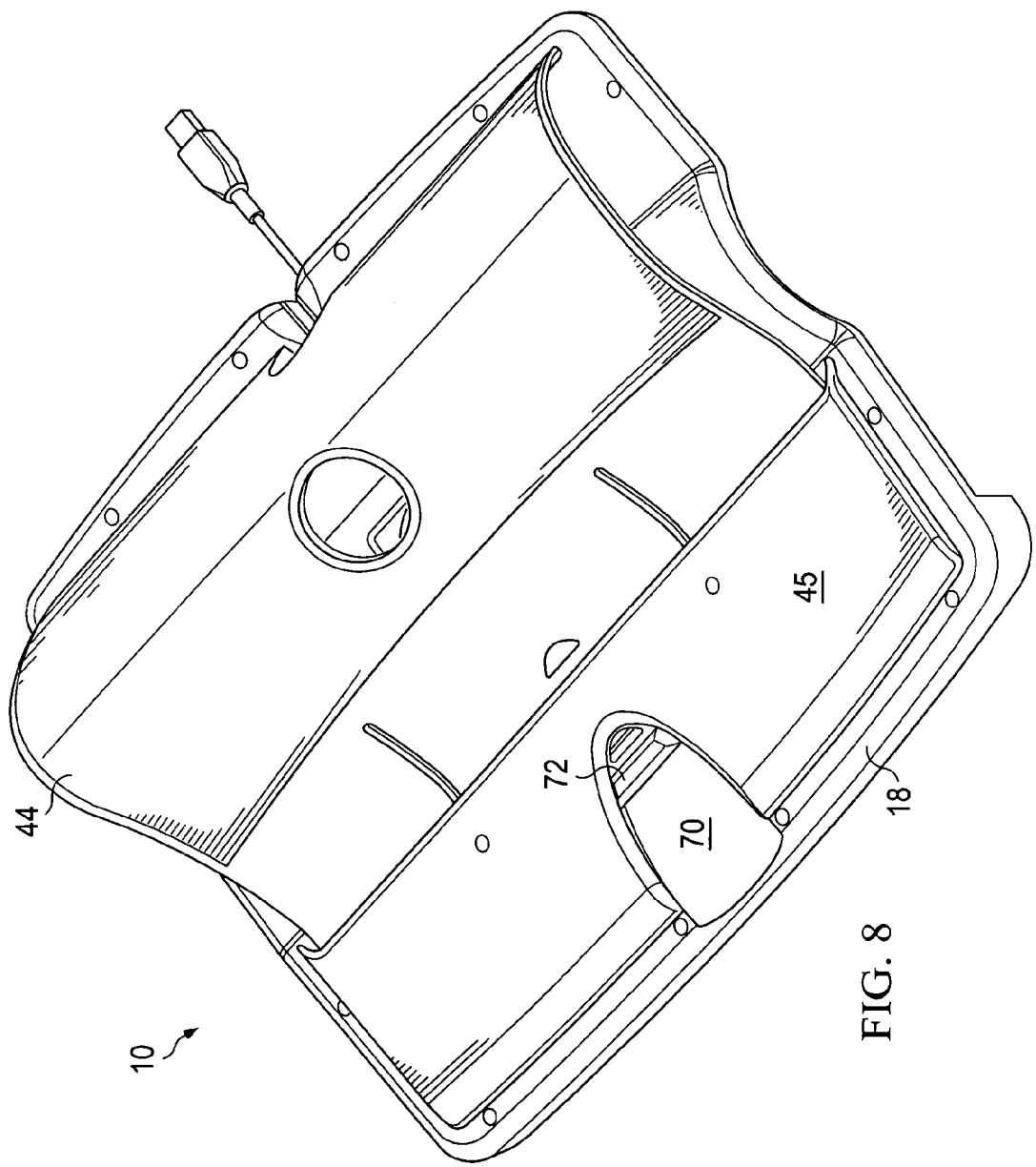
FIG. 8 shows a second embodiment of an adjustment mechanism with a depressable button coupled to the bowable member.
Figure 9:
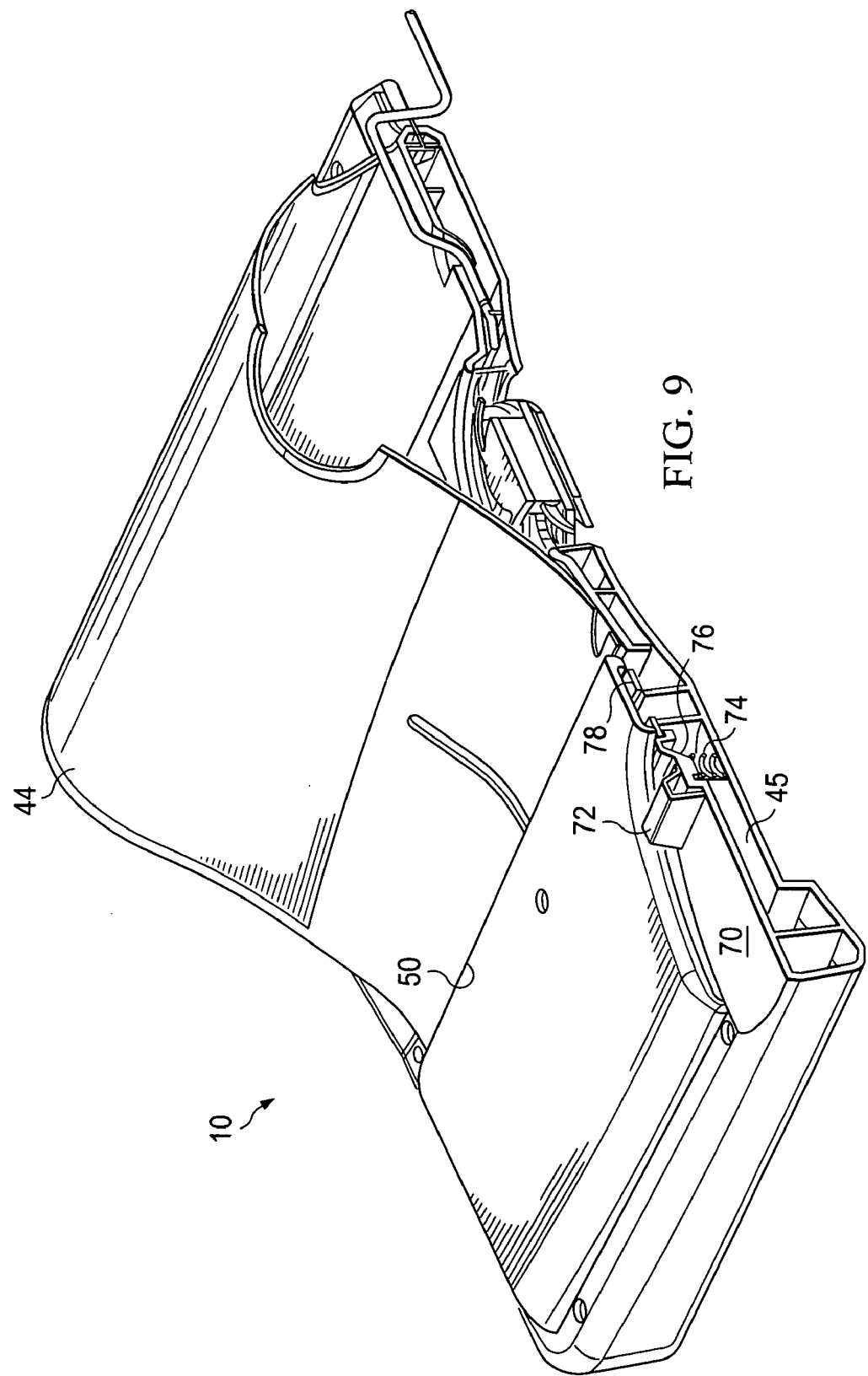
FIG. 9 shows a cutaway view of the second embodiment of an adjustment mechanism with a depressable button coupled to bowable member.

Referring now to FIGS. 8 and 9, there is shown a second embodiment of an adjustment mechanism 70. The second embodiment includes a front edge 72 of the bowable member 44, a spring 74, a button catch/release 76, and teeth 78 used for varying arc of bowable member 44 and effectively changing the inclination of the portable desk 10 in accordance with one aspect of the present invention. In FIG. 8, the underside of portable desk 10 is shown with bowable member 44 fully extended from internal recess 45.

In FIG. 9, a cutaway view of the adjustment mechanism 70 is shown. In order to decrease the inclination of top surface 12 of portable desk 10, the front edge 72 of the bowable member 44 is pulled towards the front edge 18 of portable desk 10 when spring 74 is compressed, allowing button catch/release 76 to advance to the next tooth 78 located on the front edge 50 of bowable member 78. This process can be repeated for each tooth 78 further from front edge 72 of bowable member 44 until the bowable member 44 is completely recessed in internal recess 45 and the top surface 12 of the portable desk 10 has no inclination.

In order to increase the inclination of top surface 12 of portable desk 10, the front edge 72 of the bowable member 44 is pushed towards the front edge 18 of portable desk 10 when spring 74 is compressed, allowing button catch/release 76 to retreat to the previous tooth 78 located on the front edge 50 of bowable member 78. This process can be repeated for each tooth 78 closer to front edge 72 of bowable member 44 until the bowable member 44 is completely extended from internal recess 45 and the top surface 12 of the portable desk 10 has full inclination.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A portable desktop apparatus, comprising:
   a device having opposing upper and lower major surfaces;
   a continuously flexible member disposed proximate the device lower major surface and being convex and bowed outward with respect to the device upper major surface; and
   an adjustment mechanism configured to selectively bow the flexible member outwardly from the device lower major surface.

2. The portable desktop apparatus as specified in claim 1 wherein the flexible member has a first portion secured to the device.

3. The portable desktop apparatus as specified in claim 2 wherein the flexible member has a second portion selectively positionable with respect to the device.

4. The portable desktop apparatus as specified in claim 3 wherein the adjustment mechanism is configured to selectively impart movement of the flexible member second portion.

5. The portable desktop apparatus as specified in claim 4 wherein the adjustment mechanism is configured to slidably position the flexible member second portion.

6. The portable desktop apparatus as specified in claim 5 wherein the selective positioning of the flexible member second portion defines an inclination of the device when disposed on a surface.

7. The portable desktop apparatus as specified in claim 1 wherein the outwardly bowing of the flexible member creates a spacing between the flexible member and the device lower major surface.

8. The portable desktop apparatus as specified in claim 3 wherein the device lower major surface further includes a recess, wherein the flexible member is selectively disposable into the recess as a function of the adjustment mechanism.

9. The portable desktop apparatus as specified in claim 8 wherein the flexible member second portion comprises an edge.

10. The portable desktop apparatus as specified in claim 9 wherein the flexible member first portion is affixed to the device.

11. The portable desktop apparatus as specified in claim 4 wherein the adjustment mechanism comprises a thumb wheel.

12. The portable desktop apparatus as specified in claim 11 wherein the thumb wheel is configured to advance a member against the flexible member second portion.

13. The portable desktop apparatus as specified in claim 4 wherein the adjustment mechanism comprises a depressable button.

14. The portable desktop apparatus as specified in claim 13 wherein the depressable button is configured to release and constrain the flexible member second portion.

15. The portable desktop apparatus as specified in claim 1 wherein the device upper major surface includes a fan.

16. The portable desktop apparatus as specified in claim 15 wherein the device upper major surface is concave.

17. The portable desktop apparatus as specified in claim 15 wherein the fan is configured to be powered by a USB cable coupled to the apparatus.

18. The portable desktop apparatus as specified in claim 1 wherein the device further includes a slot and a tray.

19. The portable desktop apparatus as specified in claim 18 wherein the tray is selectively disposed in the slot and retractable therefrom.

20. The portable desktop apparatus as specified in claim 18 wherein the tray is flexible.

21. The portable desktop apparatus as specified in claim 1 further comprising a flange disposed on the first major upper surface.

22. The portable desktop apparatus as specified in claim 21 wherein the flange is resilient.

* * * * *